Dec. 4, 1928. 1,694,028

E. WILDHABER

GEAR

Filed June 10, 1926 4 Sheets-Sheet 1

INVENTOR
*Ernest Wildhaber*
BY
ATTORNEY

Dec. 4, 1928.  
E. WILDHABER  
1,694,028

GEAR

Filed June 10, 1926     4 Sheets-Sheet 2

INVENTOR
*Ernest Wildhaber*
BY
ATTORNEY

Dec. 4, 1928.  
E. WILDHABER  
1,694,028  
GEAR  
Filed June 10, 1926  4 Sheets-Sheet 3

INVENTOR  
*Ernest Wildhaber*  
BY  
ATTORNEY

Dec. 4, 1928.　　　　　　　　　　　　　　　　　　　1,694,028
E. WILDHABER
GEAR
Filed June 10, 1926　　　4 Sheets-Sheet 4

INVENTOR
Ernest Wildhaber
BY
ATTORNEY

Patented Dec. 4, 1928.

1,694,028

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

GEAR.

Application filed June 10, 1926. Serial No. 115,048.

The present invention relates to gears and particularly to gears having angularly disposed non-intersecting axes.

It is the purpose of the present invention to provide a tooth shape for gears with angularly disposed non-intersecting axes which will result in intimate contact between the teeth of mating gears and which, therefore, will increase the surface strength of the gears, prolong their life and add to their carrying capacity.

A further object of this invention is to provide a pair of gears which mesh with angularly disposed non-intersecting axes, whose tooth profiles are respectively convex and concave circular arcs in sections taken perpendicularly to their respective pitch lines.

A further object of this invention is to provide a pair of gears of the character mentioned having pressure angles differing on the two sides of the teeth by such amounts as to avoid undercut or interference at the root of the pinion teeth.

Further objects of the invention will be apparent hereinafter from the specification and from the recital of the appended claims.

In the accompanying drawings certain preferred embodiments of this invention are illustrated. It will be understood, however, that the invention is capable of further modification within its scope and within the limits of the appended claims.

Figure 1:
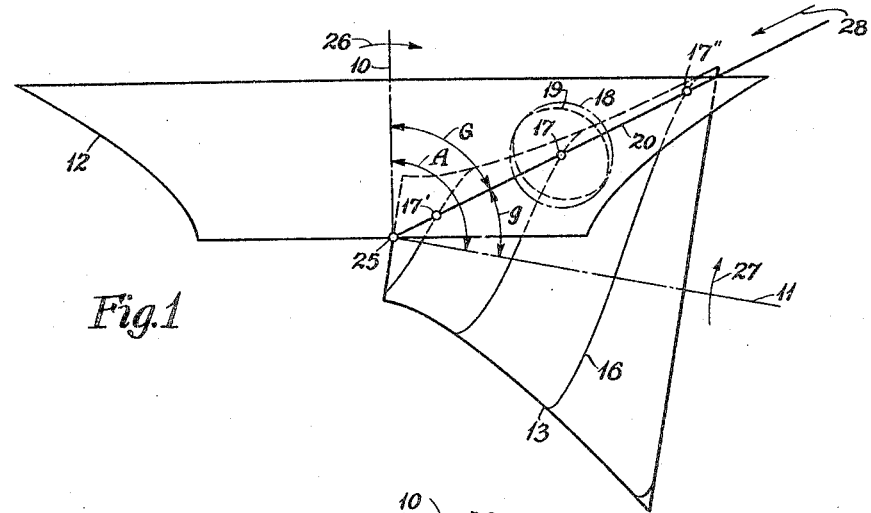
Figures 1 and 2 are a plan view and a side elevation, respectively, of a pair of hyperboloids of revolution such as might be considered the pitch surfaces of a pair of gears constructed according to this invention and showing thereon the pitch lines of such gears.

The novel tooth shape, for gears with angularly disposed non-intersecting axes, provided by the present invention can be defined broadly as part of the surface enveloped by a sphere which moves along the contact line of two surfaces of revolution which are coaxial with the two gears of a pair. In a more specific embodiment of the invention, the tooth surfaces of the gears are such as might be produced by a sphere moving along a straight line relatively to a blank which is rotating in timed relation with the sphere movement. A still more specific embodiment of the invention is obtained when the sphere moves at a constant rate along the straight line while the blank rotates in timed relation with the sphere movement. The following description has reference particularly to the latter two embodiments. The tooth surfaces of a pair of gears constructed according to this invention are parts of tube-like surfaces of constant circular cross-section which are enveloped or swept out during the relative motion of the sphere. The tooth surfaces of one member of the pair are parts of such surfaces of convex circular cross-section, while the tooth surfaces of the other member of the pair are parts of such surfaces of concave circular cross-section.

Referring now to the drawings, wherein the same reference numerals indicate the same parts in all figures, 10 and 11 are the axes of a pair of gears constructed according to this invention. These axes are disposed at an angle A to each other. As shown, the angle A is different from a right angle. The angle has been so assumed in order to permit of a broad treatment of the invention, but it is obvious that the angle may be also and, in fact, in the preferred embodiment of the invention is, a right angle. 12 and 13 are respectively surfaces of revolution coaxial with the axes 10 and 11 which may be considered the pitch surfaces of a pair of gears constructed according to this invention.

15 and 16 are lines traced on the pitch surfaces 12 and 13 by the center 17 of a sphere 18 during the motion of the center of the sphere along a line 20. As will presently be explained, the path 20 of the sphere center is so selected that it may be considered the line of contact between the two surfaces 12 and 13. In other words, the line 20 should be a line which, when rotated about the axes 10 and 11 respectively will form two surfaces of revolution contacting along the same line.

The velocity of the generating sphere 18 along the line 20 is such that the lines 15 and 16 traced on the pitch surfaces 12 and 13 by the sphere center 17 continuously contact with each other in the moving center 17. In other words, the pitch lines 15 and 16 have a common tangent at the point 17. This tangent extends in the direction of relative sliding of the two pitch surfaces at the point 17.

Figure 2:
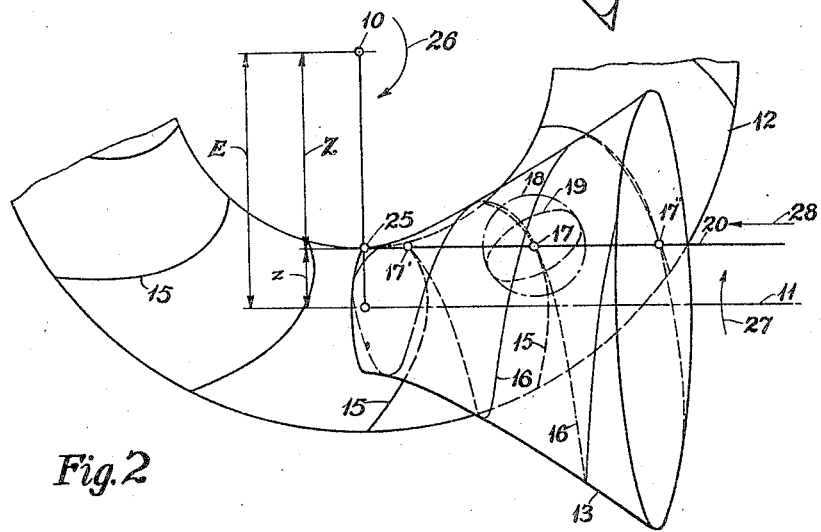

Any two surfaces of revolution which are coaxial with the gears and which contact with each other along a line can be used as pitch surfaces for a pair of gears constructed according to the present invention. In the preferred embodiment of the invention, hyperboloids of revolution are employed for the pitch surfaces, as shown in Figures 1 and 2. Such pitch surfaces are known to contact along a straight line when properly selected.

The sphere 18 moving along the straight line 20 will sweep out tube-like surfaces on the gears. These tube-like surfaces naturally contact with the sphere 18 itself in a section which passes through the sphere center 17 and which is perpendicular to the pitch line 15 or 16. Inasmuch as the lines 15 and 16 have a common tangent at the point 17, that is, have the same direction at this point, the tube-like surfaces produced on the mating gears will contact with the sphere 18 in the same section, that is, in the major circle 19 whose plane is perpendicular to the common tangent. If, therefore, part of the surface swept out by the sphere 18 is embodied as a surface of convex profile on one gear and a corresponding part of the surface swept out by the sphere is embodied as a surface of concave profile on the other gear, these surfaces will contact with the imaginary sphere 18 and with themselves along the same line and in mesh they will reproduce the relative motion which was employed in producing them. The gears will, therefore, rotate in the constant ratio of their respective tooth numbers and hence will transmit uniform motion.

The method by which the path 20 is selected and by which the rate of travel of the imaginary sphere 18 is determined will now be explained. Line 20 is assumed in a plane parallel to the axes 10 and 11. For convenience, use is made of the following symbols:

$s$ = The absolute velocity of the sphere center 17 along line 20.

$P$ = The pitch of the gears in the direction of the line 20, that is, the distance between two adjacent contact points 17 and 17' or 17 and 17'' as indicated in Figures 1 and 2.

$G, g$ = The angles between line 20 and the projected gear and pinion axes 10 and 11 respectively.

$N, n$ = The tooth numbers of gear and pinion respectively.

$V, v$ = The relative velocities of the sphere center 17 with respect to the gear and pinion.

$Vs, v_s$ = The components of the relative velocities $V, v$ in the direction of the line 20.

$Vn, v_n$ = The components of the relative velocities $V, v$ normal to line 20 and in a plane parallel to the axes 10 and 11.

$V_z, v_z$ = The components of the relative velocities $V, v$ perpendicular to the two axes 10 and 11 that is perpendicular to the drawing plane of Figure 1.

$W, w$ = The angular velocities about the axes 10 and 11.

$Z, z$ = The distances of the line 20 from the axes 10 and 11 respectively.

$E$ = The amount of offset between the axes 10 and 11.

$u$ = The distance of the sphere center 17 from the point 25, that is from the gorge circle of the hyperboloids. $u$ is measured on the line 20.

$u \sin G$, $u \sin g$ = The distances of the sphere center 17 from the axes 10 and 11, respectively, in projection as shown in Figure 1.

Assuming the directions of rotation indicated by the arrows 26 and 27 in Figures 1 and 2 and that the sphere center 17 moves inwardly in the direction of the arrow 28, the components $Vs, Vn, Vz$ of the relative velocity $V$ can be determined with the known methods of kinematics as follows:

$$Vs = s - Z W \sin G$$
$$Vn = Z W \cos G$$
$$Vz = u \sin G \, W$$

In like manner the components of the relative velocity $v$ can be determined as follows:

$$v_s = s + zw \sin g$$
$$v_n = zw \cos g$$
$$v_z = u \sin gw$$

Inasmuch as the relative paths 15 and 16 must have a common tangent at the point 17 which is the center of the moving sphere 18, the relative velocities V, $v$ of sphere center 17 with respect to either gear must have the same direction at point 17. This means that the components Vs, $v_s$, Vn, $v_n$, Vz, $v_z$ of the relative velocities are all in the same proportion as expressed by the following equations:

$$\frac{Vn}{v_n} = \frac{Vz}{v_z} \quad (1)$$

$$\frac{Vs}{v_s} = \frac{Vz}{v_z} \quad (2)$$

Substituting for these various components their values as determined above, we have:

$$\frac{ZW \cos G}{zw \cos g} = \frac{u \sin GW}{u \sin gw}$$

or:

$$\frac{Z}{z} = \frac{\tan G}{\tan g} \quad (I)$$

Z and $z$ can also be expressed as functions of the offset E.

$$Z + z = E$$

$$Z + Z \frac{\tan g}{\tan G} = Z \frac{\tan g + \tan G}{\tan G} = E$$

Hence:

$$Z = E \frac{\tan G}{\tan g + \tan G} \text{ and:}$$

$$z = E \frac{\tan g}{\tan g + \tan G}$$

If the axes 10 and 11 are disposed at right angles as is usual, $\tan g = \frac{1}{\tan G}$ and the last two equations become:

$$Z = E \cos^2 g; \quad z = E \sin^2 g. \quad (I^a)$$

Equations I or $I^a$ determine the location of the line 20 so that this line is a contact line between two hyperboloids having axes 10 and 11.

With the values obtained above equation (2) can be transformed to:

$$\frac{s - ZW \sin G}{s + zw \sin g} = \frac{u \sin GW}{u \sin gw}$$

and to:

$$\frac{s}{W \sin G} - Z = \frac{s}{w \sin g} + z.$$

$\frac{s}{W}$ = the movement of the center 17 per revolution divided by the corresponding angular motion $2\pi$, that is, $$\frac{s}{W} = \frac{PN}{2\pi}; \text{ similarly } \frac{s}{W} = \frac{Pn}{2\pi}.$$

Substituting these values in the last equation, we have:

$$\frac{P}{2\pi} \frac{N}{\sin G} - \frac{P}{2\pi} \frac{n}{\sin g} = Z + z = E$$

Whence:

$$\frac{P}{2\pi} = \frac{E}{\frac{N}{\sin G} - \frac{n}{\sin g}} \quad (II)$$

If the axes 10 and 11 are disposed at right angles, $G = 90° - g$ and $\sin G = \cos g$.

Equation (II) determines the traveling velocity $s$ of the center 17. If the center 17 moves by an amount P per tooth, as indicated above, on a line 20 whose location is given in equation (I) then it will trace two sets of curves 15 and 16 which are continuously tangent to each other and which, therefore, fulfill the requirements of the pitch lines, as previously explained.

If the gear is assumed to turn oppositely to the arrow 26, the required pinion will be of opposite hand and in formula (II) the negative sign will be replaced by a positive sign.

The pitch P along line 20 is constant and therefore, the center 17 of the sphere 18 moves at a constant rate along line 20.

Figure 3:
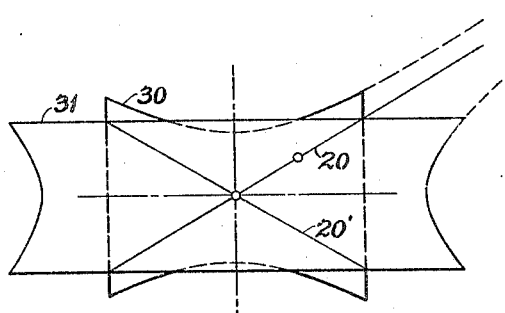
Figure 3 is a plan view, similar to Figure 1, of the pitch surfaces of a worm and worm gear constructed according to this invention.

In the case of hypoid gears tapered portions of the pitch surfaces are used as indicated in Figures 1 and 2. The diameter of the sphere 18 is then taken preferably as 1 to 3 times the normal pitch of the teeth. In the case of worm gears, the portions of the pitch surfaces used are near the gorge circles, as shown in Figure 3. Either branch 20 or 20′ of the contact line of the hyperboloids 30 and 31 may be used as the path of the sphere center 17. For worm gears, the diameter of the basic sphere 18 may be larger than for hypoids. Such parts of the conjugate surfaces are employed as tooth surfaces which are free from interference. In many cases, and especially in worm gears, the surfaces 30 and 31 which have been called the pitch surfaces will lie entirely outside of or inside of the actual teeth.

Figure 4:
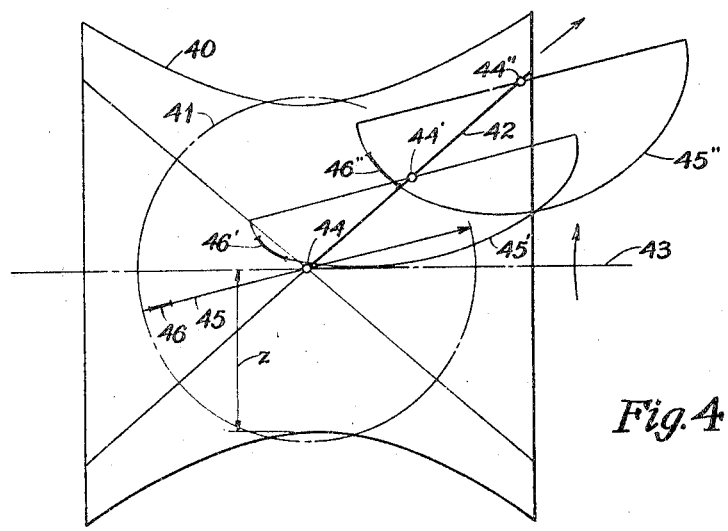
Figure 4 is a diagrammatic view further illustrating the application of this invention to the production of worms.

In the embodiment shown in Figure 4, the pitch surface 40 is outside the actual teeth or threads. The tooth surfaces are surfaces of concave profile such as might be enveloped by a sphere 41 which moves at a constant rate along the generatrix 42 of the pitch surface 40 of the worm, while the worm blank rotates on its axis 43 in timed relation with the sphere movement. During a revolution of the worm, the center 44 of the sphere will move a distance on the line 42 equal to $P$ $n$. The pitch P along the line 42 may be determined from equation (II), while the relation between angle $g$ and offset $z$ of line 42 from the axis 43 is given by formula (I) or ($I^a$). Three positions of the sphere center along line 42 are indicated at 44, 44', and 44''. In these positions contact between the sphere and the enveloped tooth surface takes place along the major circles 45, 45' and 45''. Only the halves of these great circles are shown and only a small part of these circles are used on the tooth surfaces, as indicated at 46, 46', and 46''.

Figure 5:
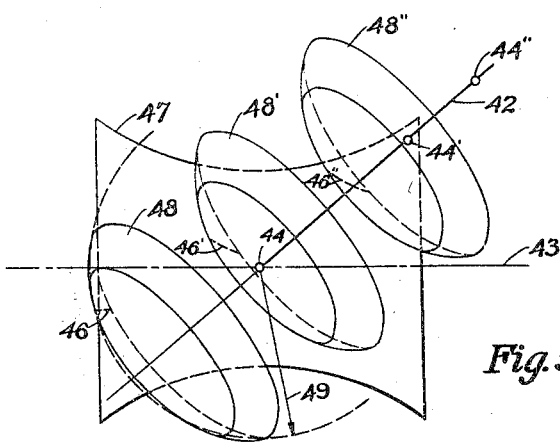
Figure 5 is a diagrammatic view illustrating the preferred method of producing worms according to this invention.

The preferred method of producing the worm 47 whose pitch surface has been indicated at 40 in Figure 4, is illustrated diagrammatically in Figure 5. Cutting tools 48 are employed which have a cutting surface covering or representing part of the spherical surface 41. The radius 49 of the cutting surface of the tool is equal to the radius of the basic sphere 41. The cutting tool is rotated on its axis while the blank rotates on its axis 43 and simultaneously a relative movement is imparted between the tool and blank along the generatrix 42. This relative movement is preferably at a constant rate and is in timed relation to the blank rotation. Three different positions 48, 48', and 48'' of the cutting wheel are shown in the figure. The contact between the cutting surface of the wheel and the finished tooth surface takes place along the lines 46, 46' and 46'' which are parts of the major circles 45, 45' and 45'' shown in Figure 4.

Figure 6:
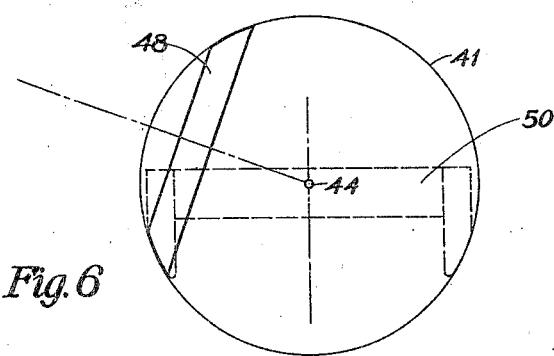
Figure 6 is a diagrammatic view showing two forms of tools which might be employed in producing gears according to this invention.

Instead of a disc shaped cutting wheel 48, any other suitable type of cutting or grinding wheel may be used, as the cutting wheel 50 of the face mill type shown in Figure 6. The tools have spherical cutting surfaces of the same diameter as the sphere 41.

Figure 7:
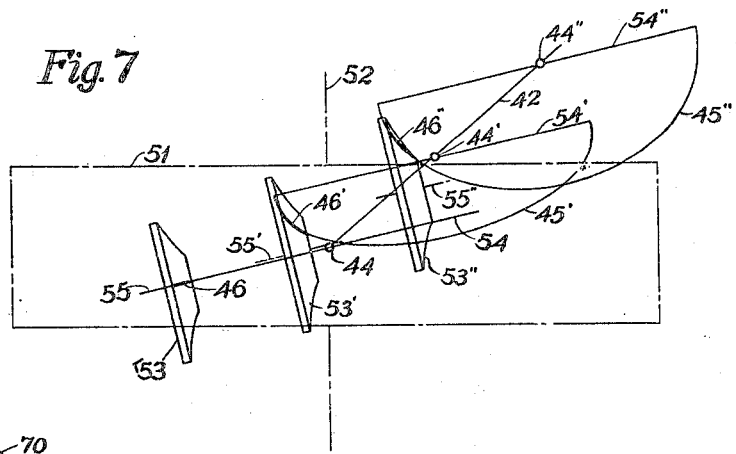
Figure 7 is a plan view illustrating diagrammatically the preferred method of producing a worm wheel according to this invention.

The preferred method of producing a worm gear to mate with the worm 47 is illustrated diagrammatically in Figure 7. 51 indicates the general contour of the worm wheel and 52 is its axis. A cutting or grinding wheel 53 having a concave cutting surface or edge is employed. The cutting surface of this wheel may be part of a concave or inside spherical surface but in order to avoid interference ordinarily such a surface is not used. Instead, preferably, the cutting wheel is provided with a cutting surface of concave circular profile which is part of a surface of revolution whose center is disposed outside of the axis of the tool and preferably also outwardly of its profile. In order that such a cutting surface may be able to contact with the blank along the arcs 46, 46' and 46'', the cutter must be swivelled about an axis 54 which continuously passes through the sphere center 44 as the sphere center moves along the generatrix 42. Three different positions of the tool 53 are shown at 53, 53' and 53'' in Figure 7. The positions of the tool axis are indicated at 55, 55' and 55'', while the positions of the axis 54 about which the tool is swivelled, and which continuously passes through the sphere centers 44, 44' and 44'', are indicated at 54, 54' and 54''. The plane containing the cutter axis 55 and the sphere center 44 is identical with the plane of the major circle 45 along which the contact between the basic sphere and the tooth surface of the worm wheel is effected. During the relative movement of the tool and blank along the generatrix 42, the blank is rotated on its axis 52 in timed relation. A swivelling movement of the character described can be readily effected.

Figure 8:
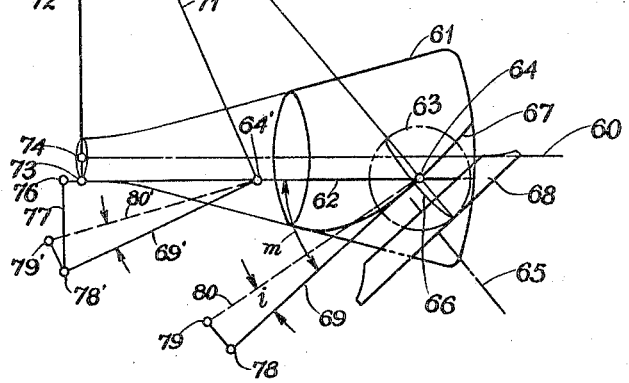
Figure 8 is a plan view illustrating diagrammatically the method of producing a hypoid pinion.

The preferred method of producing a hypoid pinion or gear is illustrated diagrammatically in Figure 8. The axis 60 of the pinion whose pitch surface is indicated at 61 is supposed to be inclined by an angle $g$ to the drawing plane. The generatrix 62 of the pitch surface 61 lies, therefore, in the plane of the drawing. A tooth surface of the pinion is a surface enveloped by a sphere 63 whose center 64 moves preferably at a constant rate along the generatrix 62. Contact between the imaginary sphere 63 and the finished tooth surface takes place along a major circle 66 whose plane is perpendicular to the pitch line 67 of the pinion. This plane is identical with the plane containing the sphere center 64 and the axis 65 of the cutting or grinding wheel 68 which is used to sweep out the pinion tooth surfaces. The movements imparted between the tool 68 and the blank are those employed in producing the worm wheel 51. The normal to the plane of the major circle 66 projects into a line 69. The location of this normal which determines the spiral angle of the pinion teeth required to obtain the desired tooth contact can be determined from the angle $m$ which the normal makes with the generatrix 62 and from the inclination $i$ of this normal to the plane of Figure 8. The angle $m$ can be computed like the angle of relative velocity $v$.

$$\tan m = \frac{v_z}{v_s} = \frac{u \sin gw}{s + zw \sin g} = \frac{u}{\frac{s}{w \sin g} + z}$$

since $$\frac{s}{w} = \frac{Pn}{2\pi}; \quad \tan m = \frac{u}{\frac{Pn}{2\pi \sin g} + z}.$$

The angle $m$ equals the angle formed at 70 by the lines 71 and 72, the line 71 being drawn perpendicular to the line 69 and the line 72 being perpendicular to the generatrix 62. The distance 64—73 equals $u$. The distance 70—73 equals therefore:

$$\frac{Pn}{2\pi \sin g} + z,$$

which is a constant. The distance 73—74 itself equals $z$. Point 70 can be located, therefore, by plotting on line 72 a distance $\frac{Pn}{2\pi \sin g}$ from the point 74. Any line 71, 71' which is perpendicular to the normal 69, 69' can then be readily located by connecting points 64 or 64' and 70.

The inclination $i$ of the normal with respect to the plane of Figure 8 can be found in like manner to be:

$$\tan i = \frac{\cos m}{\dfrac{Pn}{2\pi z \cos g} + \tan g}$$

Angle $i$ can be found graphically as follows. The constant distance $$\frac{Pn}{2\pi z \cos g} + \tan g$$

is plotted on line 62 from point 64' to 76. The line 77 is drawn through 76 perpendicular to line 62 to intersect line 69' in point 78'. A unit, such as one inch, is plotted on a line drawn through 78' perpendicular to 69', that is parallel to 71'. The line connecting the resulting point 79' with 64' and shown in dotted lines at 80' includes the angle $i$ with the line 69'. The tangent of this angle fulfils the above equation.

From the equations last derived in the spiral angle of the pinion can be computed so that the gear and pinion will mesh along the contact line 62.

Figure 9:
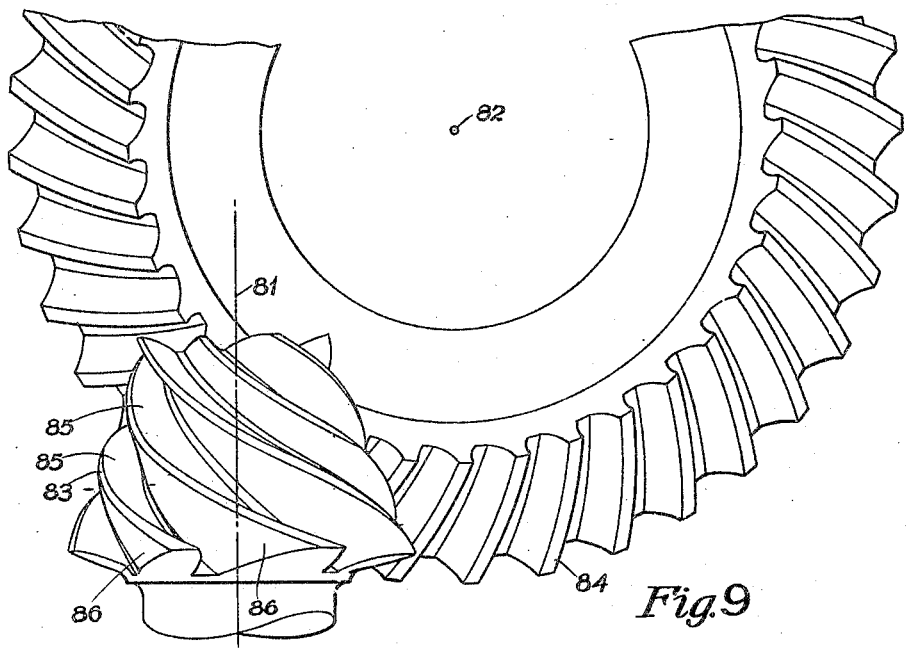
Figure 9 is a side elevation of a pair of hypoid gears constructed according to the preferred form of this invention.

A pair of hypoid gears constructed according to the preferred form of this invention are illustrated in Figure 9. The pinion axis 81 is offset from the gear axis 82 by the distance E and the pinion is provided with teeth 83 whose side surfaces are of convex profile in planes perpendicular to the pitch lines of the pinion, while the gear is provided with teeth 84 whose side surfaces are of concave profile in such planes. The spiral angle of the pinion teeth is preferably made larger than the spiral angle of the gear teeth. By such a construction and by determining the generatrices of the pitch surfaces of gear and pinion so that the angle between the generatrix and a line drawn parallel to the axis of the blank is larger than $p$, where $\tan p = \dfrac{n}{N}$, the pinion can be made larger than a bevel pinion of a corresponding ratio and the strength of the pair correspondingly increased.

I have found that in hypoid gears in general and in hypoid gears constructed according to the present invention particularly, the danger of interference is different on the two sides of the teeth. Where the spiral angle of the pinion or smaller member of the pair is larger than the spiral angle of the gear or larger member of the pair, the danger of interference is much smaller on the longitudinally concave sides 85 of the pinion teeth, than on the longitudinally convex sides 86 of the teeth. For this reason the pressure angles are preferably made different on the two sides of the teeth. The pressure angle will be smaller on the concave sides 85 of the teeth in the embodiment considered. Frequently the longitudinally concave sides of the pinion teeth may be made the driving sides and usually the pressure angle on this side of the teeth may be made as low as zero degrees without causing undue interference, a feature which could never be achieved on gears with intersecting or parallel axes. The pressure angles of the opposite sides 86 of the teeth may be correspondingly increased over the corresponding sides of the teeth of spiral bevel gears.

Figure 10:
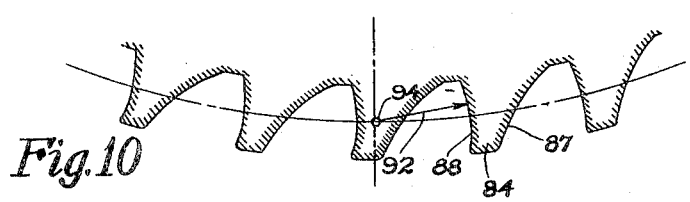
Figures 10 and 11 are diagrammatic views illustrating, respectively, sections through a hypoid gear and pinion in planes perpendicular to their respective pitch lines.
Figure 11:
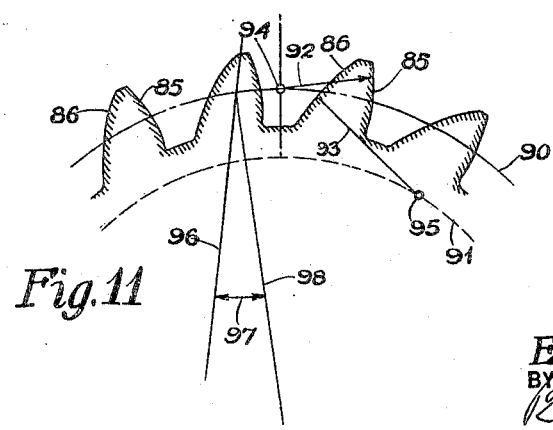

Figures 10 and 11 are corresponding sections through the pitch surfaces of a hypoid gear and pinion respectively taken in planes perpendicular to the pitch lines of the two members. For convenience the spacing of the profiles is shown constant in the drawing. Both sides of the teeth 84 and 83 of the gear and pinion are surfaces such as might be enveloped by a sphere. The sides 87 and 88 of the gear teeth 84 are of substantially concave circular profile, while the sides 85 and 86 of the pinion teeth 83 are of substantially convex circular profile. To secure the desired different pressure angles on the opposite sides of the teeth, the two sides 85 and 86 of the pinion teeth are constructed to correspond to different pitch surfaces 90 and 91, the tooth profiles 85 and 86 being substantially circular arcs of radii 92 and 93 respectively whose centers are at 94 and 95 respectively on the pitch surfaces 90 and 91 respectively. This structure is possible because the pitch surfaces of hypoid gears do not depend solely on the relative position of a pair of gears and their ratio as the pitch surfaces of bevel and spur gears. On the contrary, an infinite number of pairs of pitch surfaces can be assumed for a given position of a pair of hypoid gears of a given ratio. This is evident also from the formulas already derived. It should be noted that the average pressure angle of profiles 85 is below the usual pressure angle of gears and is around zero degrees.

Figure 12:
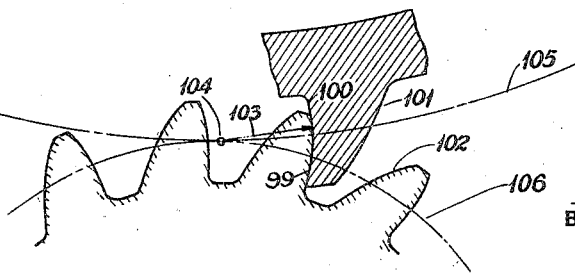
Figure 12 is a diagrammatic view similar to Figures 10 and 11 illustrating the mesh of a pair of hypoid gears constructed according to a modified form of this invention.

The pressure angles of the two sides of the gear teeth are made different to conform to those of the mating sides of the pinion teeth. On account of the different pressure angles on the two sides of the teeth the central lines of the teeth are inclined at an angle to the radii of the gears, as indicated in Figure 11, where the center line 96 of the pinion teeth is shown inclined at an angle 97 to the radius 98. This offsets any undercut and avoids interference in contradistinction of such a structure in other types of gears.

Where the longitudinally concave sides 99 of the pinion teeth and the mating longitudinally convex sides 100 of the gear teeth are used as the driving sides, the opposite sides of the gear and pinion teeth need not be constructed according to this invention but may be formed in any suitable way. A section through a pair of hypoid gears having a modified profile on one side of the teeth is shown in Figure 12. The profiles of the driving sides of the pinion teeth are convex and the profiles 100 of the longitudinally convex sides of the gear teeth are concave, but the opposite sides 101 and 102 of the gear and pinion teeth are both convex. Here again the pressure angles are preferably made different on the two sides of the teeth, the pressure angle of the profiles 99 being considerably below the usual pressure angle of gears and around zero degrees. The profiles of the tooth sides 99 and 100 are circular arcs of equal radii 103 the center of a pair of such tooth profiles being shown at 104 on the pitch surfaces 105 and 106. The tooth sides 101 and 102 with the larger pressure angles may be formed in any suitable way.

The tooth shape of gears constructed according to this invention can be applied also to a pair consisting of a crown gear and a worm, where the crown gear has a plane pitch surface and the worm has a cylindrical pitch surface. In this case the sphere center moves along the straight line of contact between said pitch plane and the pitch cylinder and the lines traced by the sphere center on the two pitch surfaces are preferably identical with the pitch lines produced on the hob and gear described in my copending application, Serial No. 38,724, filed June 22, 1925. In development the pitch lines of the worm are then parabolas.

Gears constructed according to this invention can be produced quickly and in a simple operation, the blanks being cut without roll and preferably in a continuous indexing process.

While I have described and illustrated certain preferred embodiments of my invention, it will be understood that the invention is capable of further modification within its scope and within the limits of the appended claims and that this application is intended to cover any variations, uses, or adaptations, of this invention following in general, the principles of the invention and including such departures from the present disclosure as come within known or customary practice in the gear art and as may be applied to the essential features hereinbefore set forth and as fall within the limits of the appended claims.

Having thus described my invention, what I claim is:

1. A pair of gears adapted to mesh with axes non-intersecting and non-parallel, each of which has teeth extending across its face along lines inclined to the generatrices of its pitch surface, the profiles of the side tooth surfaces of said gears in planes perpendicular to their respective pitch lines being single circular arcs.

2. A pair of gears adapted to mesh with axes non-intersecting and non-parallel, each of which has teeth extending across its face along lines inclined to the generatrices of its pitch surface, the profiles of the side tooth surfaces of said gears in planes perpendicular to their respective pitch lines, being single circular arcs having centers which lie outside the respective teeth.

3. A pair of gears adapted to mesh with axes non-intersecting and non-parallel, each of which has teeth extending across its face along lines inclined to the generatrices of its pitch surface, said gears having side tooth surfaces whose profiles, in planes perpendicular to their respective pitch lines, are in the form of single circular arcs having centers located on the pitch surfaces of the respective gears.

4. A pair of gears adapted to mesh with axes non-intersecting and non-parallel, each of which has teeth extending across its face along lines inclined to the generatrices of its pitch surface, said gears having side tooth surfaces whose working portions in planes perpendicular to their respective pitch lines are in the form of single circular arcs having centers which lie outside the respective teeth and on the pitch surfaces of the respective gears.

5. A pair of gears adapted to mesh with axes non-intersecting and non-parallel, each of which has teeth extending across its face along lines inclined to the generatrices of its pitch surface, one of said gears being provided with active tooth surfaces which in planes perpendicular to its pitch lines are exclusively convex circular arcs and the other of said gears having active tooth surfaces which in planes perpendicular to its pitch lines are exclusively concave circular arcs.

6. A pair of gears adapted to mesh with axes non-intersecting and non-parallel, each of which has teeth extending across its face along lines inclined to the generatrices of its pitch surface, said gears having active tooth surfaces, the profiles of which in planes perpendicular to their respective pitch lines are single circular arcs, mate profiles having substantially the same radius.

7. A pair of gears adapted to mesh with axes non-intersecting and non-parallel, each of which has teeth extending across its face along lines inclined to the generatrices of its pitch surface, one of said gears having active tooth surfaces whose profiles, in planes perpendicular to its pitch lines, are exclusively convex circular arcs, and the other of said gears having active tooth surfaces whose profiles, in planes perpendicular to its pitch lines are exclusively concave circular arcs, the centers of the profiles of each gear being located on the respective pitch surfaces.

8. A pair of gears adapted to mesh with axes non-intersecting and non-parallel, each of which has teeth extending across its face along lines inclined to the generatrices of its pitch surface, said gears having complementary tooth profiles in planes perpendicular to the pitch lines of the respective gears, mate profiles being respectively, convex and concave circular arcs of substantially equal radii.

9. A pair of gears adapted to mesh with axes non-intersecting and non-parallel, each of which has teeth extending across its face along lines inclined to the generatrices of its pitch surface, said gears having complementary tooth profiles in planes perpendicular to the pitch lines of the respective gears, mate profiles being respectively convex and concave arcs of circles whose diameters are 1 to 3 times the normal pitch.

10. A pair of gears adapted to mesh with axes non-intersecting and non-parallel, each of which has teeth extending across its face along lines inclined to the generatrices of its pitch surface, said gears having complementary tooth profiles in planes perpendicular to the pitch lines of the respective gears, mate profiles being wholly convex and wholly concave respectively.

11. A pair of gears adapted to mesh with axes non-intersecting and non-parallel, each of which has teeth extending across its face along lines inclined to the generatrices of its pitch surface, said gears having complementary tooth profiles in planes perpendicular to the pitch lines of the respective gears, mate profiles being respectively convex and concave circular arcs, the profiles of opposite sides of the teeth of the respective gears being of unequal radii.

12. A pair of gears adapted to mesh with axes non-intersecting and non-parallel, each of which has teeth extending across its face along lines inclined to the generatrices of its pitch surface, said gears having tooth profiles on the driving side of the respective teeth which are complementary in planes perpendicular to the pitch lines of the respective gears, mate driving profiles being respectively convex and concave circular arcs.

13. A pair of gears adapted to mesh with axes non-intersecting and non-parallel each of which has teeth extending across its face along lines inclined to the generatrices of its pitch surface, said gears having tooth profiles on the driving sides of the respective teeth which are complementary in planes perpendicular to the pitch lines of the respective gears, mate driving profiles being wholly convex and wholly concave respectively.

14. A hypoid gear having teeth extending across its face along lines inclined to the generatrices of its pitch surface, said gear having teeth whose active tooth surfaces have profiles in the form of single circular arcs, the centers of the profiles of a tooth lying on opposite sides of said tooth.

15. A hypoid gear having teeth extending across its face along lines inclined to the generatrices of its pitch surfaces, said gear having teeth whose active tooth surfaces have profiles in the form of single circular arcs, the centers of the profiles of a tooth lying on opposite sides of said tooth and being located substantially on the pitch surface of said gear.

16. A hypoid gear having teeth extending across the face along lines inclined to the generatrices of its pitch surface, said gear having teeth which are of constant pitch along a straight line offset from its axis, the profiles of the active surfaces of which are in the form of single circular arcs, the centers of the profiles of a tooth lying on opposite sides of said tooth.

17. A hypoid gear having teeth extending across its face along lines inclined to the generatrices of its pitch surface, said gear having teeth whose active tooth surfaces have profiles in the form of single arcs of circles whose diameters are 1 to 3 times the normal pitch, the centers of the profiles of the tooth lying on opposite sides of said tooth.

18. A pair of gears adapted to mesh with axes non-intersecting and non-parallel and each of which has teeth extending across its face along lines inclined to the generatrices of its pitch surface, said gears containing respectively convex and concave mate tooth profiles of substantially the same shape in planes perpendicular to their pitch lines.

19. A pair of gears adapted to mesh with axes non-intersecting and non-parallel, each of which has teeth extending across its face along lines inclined to the generatrices of its pitch surface and each of which is of constant pitch along a straight line offset from its axis, said gears having complementary tooth profiles in planes perpendicular to their pitch lines, mate profiles being respectively convex and concave circular arcs.

20. A pair of gears adapted to mesh with axes non-intersecting and non-parallel and each of which has teeth extending across its face along lines inclined to the generatrices of its pitch surface, the inclination angle of the teeth of the smaller gear being larger than the inclination angle of the teeth of the larger gear, said gears having complementary tooth profiles in planes perpendicular to their pitch lines, mate profiles being respectively convex and concave circular arcs.

21. A pair of gears adapted to mesh with axes non-intersecting and non-parallel, one of which has tooth surfaces such as might be enveloped by a sphere moving along a straight line offset from the axes of the blank and inclined to a line parallel to the blank axis by an amount greater than $p$, where $\tan p = \frac{n}{N}$ and $n$ and $N$ are the tooth numbers of said gear and the mate gear respectively.

22. A pair of gears adapted to mesh with axes non-intersecting and non-parallel, each of which has teeth extending across the face along lines inclined to the generatrices of its pitch surface and each of which is of constant pitch along a straight line offset from its axis, said gears having, respectively, exclusively convex and concave profiles, mate profiles being complementary.

23. A pair of gears adapted to mesh with axes non-intersecting and non-parallel and each of which has teeth extending across its face along lines inclined to the generatrices of its pitch surface, the inclination angle of the teeth of the smaller gear being larger than the inclination angle of the teeth of the larger gear, said gears having, respectively, exclusively convex and concave profiles, mate profiles being complementary.

ERNEST WILDHABER.